(12) United States Patent
Kamila et al.

(10) Patent No.: US 11,077,931 B2
(45) Date of Patent: Aug. 3, 2021

(54) STOP PADS FOR AIRCRAFT FOLDING WING TIPS

(71) Applicant: The Boeing Company, Chicago, IL (US)

(72) Inventors: Eric S. Kamila, Edmonds, WA (US); Eric G. Gruner, Seattle, WA (US)

(73) Assignee: The Boeing Company, Chicago, IL (US)

( * ) Notice: Subject to any disclaimer, the term of this patent is extended or adjusted under 35 U.S.C. 154(b) by 448 days.

(21) Appl. No.: 16/052,102

(22) Filed: Aug. 1, 2018

(65) Prior Publication Data

US 2020/0039630 A1  Feb. 6, 2020

(51) Int. Cl.
*B64C 3/56* (2006.01)

(52) U.S. Cl.
CPC ..................... *B64C 3/56* (2013.01)

(58) Field of Classification Search
CPC ........... Y02T 50/10; Y02T 50/30; B64C 3/56; B64C 3/187; B64C 23/072; B64C 21/00; B64C 23/065; B64C 23/06; B64C 23/076
See application file for complete search history.

(56) References Cited

U.S. PATENT DOCUMENTS

| 5,350,135 A | * | 9/1994 | Renzelmann | B64C 3/56 244/49 |
| 9,469,392 B2 | * | 10/2016 | Fox | B64C 23/072 |
| 2010/0021718 A1 | * | 1/2010 | Vos | B29C 65/48 428/315.9 |
| 2015/0203190 A1 | * | 7/2015 | Witte | B64C 5/08 244/199.4 |
| 2017/0066521 A1 | | 3/2017 | Fox et al. | |
| 2017/0355440 A1 | * | 12/2017 | Bishop | B64C 3/56 |
| 2019/0367155 A1 | * | 12/2019 | Dege | B64C 3/56 |

OTHER PUBLICATIONS

European Patent Office, "Extended European Search Report", issued in connection with application No. 19188752.0 dated Nov. 15, 2019, 6 pages.

\* cited by examiner

*Primary Examiner* — Assres H Woldemaryam
(74) *Attorney, Agent, or Firm* — Hanley, Flight & Zimmerman, LLC (57) ABSTRACT

Stop pads for aircraft folding wing tips are described herein. An example aircraft wing includes a fixed wing portion and a wing tip moveably coupled to the fixed wing portion about a hinge axis. The wing tip is moveable between an extended position and a folded position. The aircraft wing also includes a first stop pad coupled to the fixed wing portion, the first stop pad having a first contact surface, and a second stop pad coupled to the wing tip, the second stop pad having a second contact surface. The first and second contact surfaces are to engage each other when the wing tip is in the extended position. A contact plane between the first and second contact surfaces is coplanar with the hinge axis.

20 Claims, 9 Drawing Sheets

STOP PADS FOR AIRCRAFT FOLDING WING TIPS

FIELD OF THE DISCLOSURE

This disclosure relates generally to aircraft and, more particularly, to stop pads for aircraft folding wing tips.

BACKGROUND

Larger aircraft have longer wingspans, which tend to produce more efficient flight. However, taxiway spacing and gate locations for most airports do not provide adequate spacing to accommodate such large wingspans. Therefore, longer wingspan aircraft typically employ folding wing tips. After landing, the wing tips are folded (upwards, downwards, forward, aft or a combination thereof) to reduce the wingspan of the aircraft.

SUMMARY

An example aircraft wing disclosed herein includes a fixed wing portion and a wing tip moveably coupled to the fixed wing portion about a hinge axis. The wing tip is moveable between an extended position and a folded position. The aircraft wing also includes a first stop pad coupled to the fixed wing portion, the first stop pad having a first contact surface, and a second stop pad coupled to the wing tip, the second stop pad having a second contact surface. The first and second contact surfaces are to engage each other when the wing tip is in the extended position. A contact plane between the first and second contact surfaces is coplanar with the hinge axis.

Another example aircraft wing disclosed herein includes a folding wing tip and a stop pad coupled to the folding wing tip. The stop pad includes a filler plate disposed on a surface of the wing tip and a wear plate disposed on the filler plate, such that the filler plate is disposed between the surface of the wing tip and the wear plate.

An example method disclosed herein includes disposing a filler plate on a surface of a wing tip of an aircraft, the wing tip moveably coupled to a fixed wing portion of the aircraft, disposing a wear plate on the filler plate, such that the filler plate is disposed between the surface of the wing tip and the wear plate, and coupling the filler plate and the wear plate to the surface of the wing tip via a threaded fastener.

The figures are not to scale. Instead, the thickness of the layers or regions may be reduced or enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Disclosed herein are example stop pads for use on aircraft with folding wing tips. The example stop pads can be disposed on the wing tip and/or the fixed inboard portion of the wing and form a contact area between the wing tip and the fixed inboard portion of the wing when the wing tip is in an extended position. The example stop pads reduce or eliminate wear and/or damage directly to the wing tip and the inboard portion of the wing.

Before turning to the detailed aspects of the example stop pads, a brief discussion of folding wing tips is provided. It is generally known that longer, lighter and/or thinner wings are more aerodynamically efficient than shorter, heavier wings. Likewise, higher aspect ratio wings produce more efficient flight than lower aspect ratio wings. An aspect ratio of a wing is the ratio of its length to its breadth (chord). Therefore, longer, narrower wings are desirable because they produce more efficient flight (e.g., reduced fuel consumption). However, existing airports present challenges to aircraft having relatively large wingspans (e.g., the distance between the ends or tips of the wings). Airport designs are based on International Civil Aviation Organization (ICAO) Codes A through F, which establish dimensional limits on wingspans, landing gear, width, length, etc. Most airports are designed to accommodate aircraft up to ICAO Code E, which limits wingspans to less than 65 meters so that aircraft can fit through runways, taxiways, gate areas, etc. Therefore, aircraft with larger wingspans (e.g., greater than 65 meters) can employ folding wing tips, which enable the wingspan of the aircraft to be reduced so that the aircraft can fit within the current airport infrastructure (e.g., parking areas, taxiways, etc.).

In regards to an aircraft having folding wing tips, each wing of the aircraft includes an inboard or fixed wing portion (e.g., section) and a movable or non-fixed outboard wing portion, i.e., the wing tip, that is moveably coupled to the fixed wing portion. In particular, the wing tips are rotatably coupled to the respective fixed wing portions via hinges. Each wing tip is moveable (rotatable) between an extended position (sometimes referred to as a deployed position, a flight position, or an unfolded position) in which the wing tip extends generally outward from the fixed wing portion and a folded position (sometimes referred to as a stowed or stored position) in which the wing tip is rotated upward to decrease the overall wing span of the aircraft. To move or transition the wing tips from the extended position to the folded position (e.g., after landing), the aircraft includes folding wing tip actuation systems. The actuation systems include one or more actuators located between the fixed wing portions of the wings and the wing tips. The wings may include locking mechanisms to lock or secure the wing tips in their extended position during flight. After landing, the locking mechanisms are disengaged, and the actuators move (e.g., lift, transition, rotate, etc.) the wing tips about their respective hinges from the extended position to the folded position. Similarly, before take-off, the actuators move the wing tips downward to the extended position and the locking mechanisms are activated to lock the wing tips in the extended position.

In some examples, to prevent a wing tip from being rotated downward beyond the extended position and/or to assist in holding the wing tip in the extended position while the locking mechanism is engaged, one or more ledges or stops may be provided on the wing tip and the fixed wing portion of the wing. The ledges are positioned (e.g., along a same radial arc) to engage each other if the wing tip is rotated beyond the extended position.

Disclosed herein are example stop pads that can be used to reduce or eliminate wear and/or damage to a wing tip and/or a fixed wing portion of an aircraft wing. In some examples, a first stop pad is disposed on and coupled to a ledge (or another structural component) of the fixed wing portion and a second stop pad is disposed on and coupled to a ledge or another structural component) of the wing tip. When the wing tip is moved to the extended position, the first and second stop pads engage each other and prevent direct contact between the ledges of the wing tip and the fixed wing portion. In some examples, when moving the wing tip into the extended position, the wing tip actuator applies a relatively high load (sometimes referred to as preload) on the wing tip that forces the first and second stop pads against each other. This relatively high load prevents the wing tip from moving (e.g., bouncing, chattering, etc.) and, thus, prevents the first and second stop pads from moving apart from each other. While the load is being applied, a locking mechanism may be activated to lock the wing tip in the extended position. Then, the preload is removed. While the wing tip is in the extended position, the first and second stop pads remain in contact. In some examples, movement (e.g., slippage) may occur between the stop pads while the wing tip is in the extended position. Over time, this repetitive contact and/or movement between the first and/or second stop pads may cause the first and/or second stop pads to wear or erode. The stop pads are relatively inexpensive and can be replaced much more easily than replacing the entire wing tip or the fixed wing portion.

Therefore, rather than allowing the ledges on the wing tip and the fixed wing portion to engage each other, which can potentially cause wear and/or damage over time, the example stop pads are used to absorb the wear and/or damage.

In some examples, the two stop pads are positioned such that a contact plane occurring between the two stop pads (when engaged) is coplanar with the hinge axis of the wing tip. This contact plane is also perpendicular to a radial arc of the hinge line. This position decreases the amount of shearing or lateral movement between the two pads. Further, because the contact plane is perpendicular to the radial arc of the hinge line, a majority of the force incurred from movement between the wing tip and the fixed wing portion is perpendicular to the stop pads and, thus, is absorbed as compressive forces on the two stop pads.

In some examples, the stop pad on the fixed wing portion and the stop pad on the wing tip include wear plates. In some examples, one of the wear plates is harder than the other wear plate, such that the softer (sacrificial) wear plate is the only plate that wears and eventually needs to be replaced. For example, the harder wear plate may be constructed of stainless steel and the softer wear plate may be constructed of a copper-nickel-tin alloy. In some examples, the location of the stop pad on the wing tip is more accessible than the location of the stop pad on the fixed wing portion. As such, the stop pad on the wing tip may implement the softer (sacrificial) wear plate, which can then be more easily accessed and replaced when worn out.

In some examples, the stop pad on the wing tip includes a filler plate that is disposed between the wear plate and the ledge of the wing tip. The filler plate may be selected from a plurality of filler plates having different thicknesses. Depending on the desired position (height) of the wear plate relative to the ledge, an appropriate thickness filler plate can be selected. The filler plate enables the wear plate to be positioned in a location where, when the wear plates engaged each other during preload (e.g., before take-off, after landing), the wing tip is aligned in a correct position to be engaged or disengaged by the locking mechanism (e.g., receive a pin or lug in a receiving hole). Thus, the position of the wear plate on the wing tip is easily adjustable.

In some examples, the filler plate is constructed of a frangible material, such as an aluminum-silicon bronze alloy. A frangible material is selected that does not yield during normal operating conditions (e.g., from wing bending/deflection occurring during flight, while the wing tip actuator is driving the wing tip downward, etc.), but yields when subjected to a significantly high impact or force outside of the normal operating conditions, such as during a free-fall event. A free-fall event occurs when the wing tip free falls from the folded position to the extended position (without controlled movement by the actuator). In such an instance, the frangible material of the filler plates yields to distribute the load through plastic deformation, thereby dampening the impact between the two components and, thus, reducing potentially expensive damage to the two components. Therefore, the example stop pads are configured to handle complex structural flight and ground loads.

Figure 1:
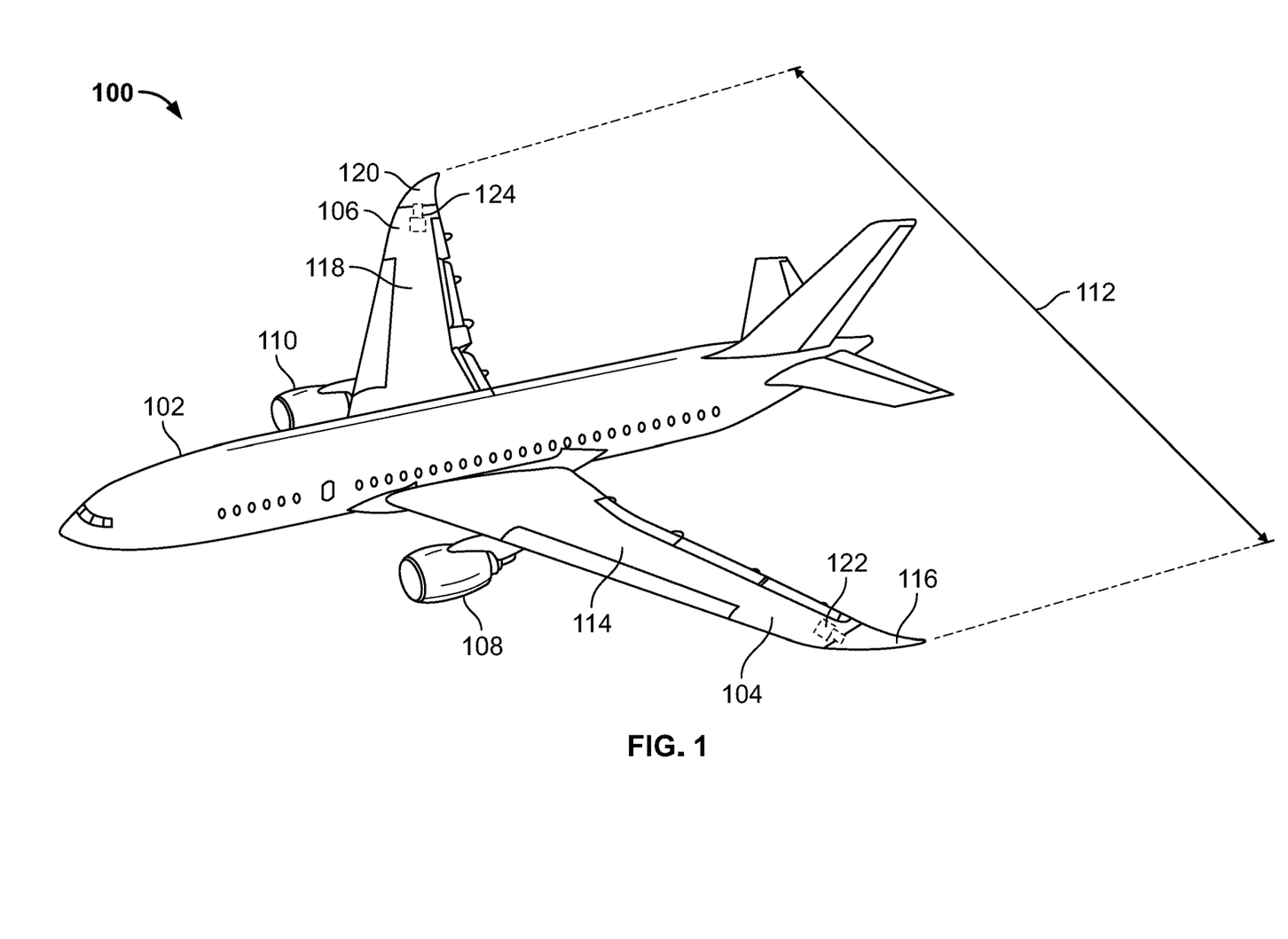
FIG. 1 illustrates an example aircraft with folding wing tips in which examples disclosed herein may be implemented.
Figure 3:
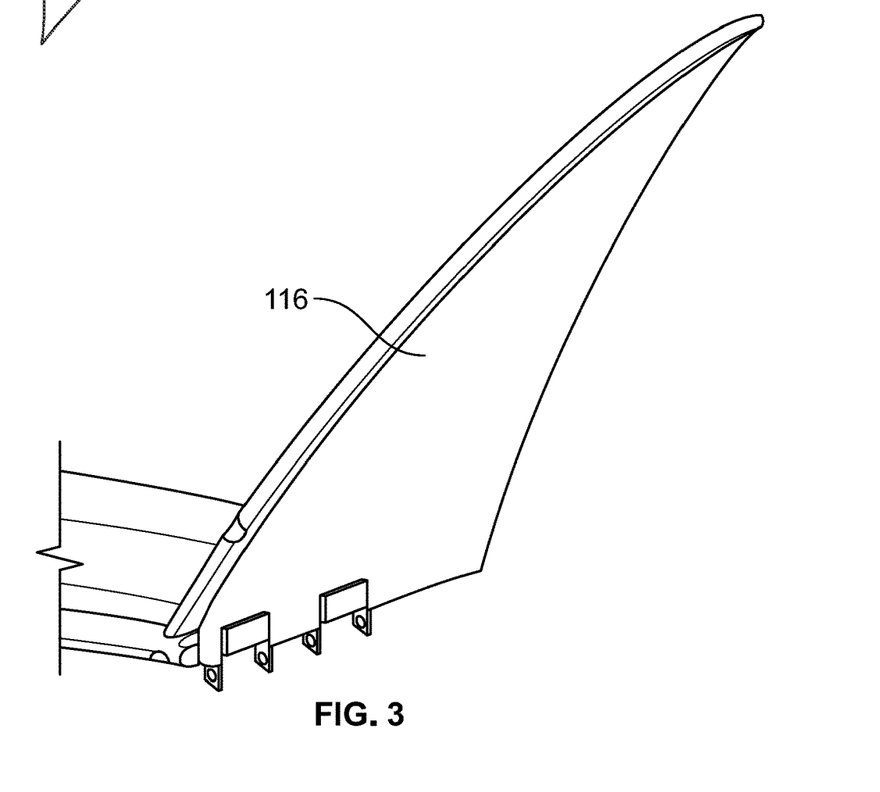
FIG. 3 is a perspective view of the example wing from FIG. 2 in which the example wing tip is in a folded position.

FIG. 1 illustrates an example aircraft 100 in which the examples disclosed herein may be implemented. In the illustrated example, the aircraft 100 includes a fuselage 102, a first or left wing 104 coupled to the fuselage 102, and a second or right wing 106 coupled to the fuselage 102. The first and second wings 104, 106 carry respective engines 108, 110. In the illustrated example, the first and second wings 104, 106 include wing tips, which may be transitioned from an extended or flight position (as shown in the position in FIG. 1) to a stored or folded position to decrease a wingspan 112 of the aircraft 100. In particular, the first wing 104 includes a first fixed wing portion 114 (e.g., an inboard wing portion) and a first wing tip 116 (e.g., a non-fixed portion, an outboard wing portion). The first wing tip 116 is hingeably coupled to the first fixed wing portion 114 and rotates or folds upward about a hinge axis to move between the extended position (the position shown in FIG. 1) and the folded position (the position shown in FIG. 3). Similarly, the second wing 106 includes a second fixed wing portion 118 and a second wing tip 120, which is hingeably coupled to the second fixed wing portion 118. To reduce the wingspan 112 (e.g., after landing, before taxiing to a gate, etc.), the first and second wing tips 116, 120 may be moved to the folded position. The first and second wing tips 116, 120 are actuated by respective first and second wing tip actuators 122, 124 to move or transition the first and second wing tips 116, 120 between the extended position, as shown in FIG. 1, and the folded position, in which the first and second wing tips 116, 120 are rotated upwards. The first and second wing tip actuators 122, 124 may be hydraulic actuators, for example. In some examples, the first and second wing tips 116, 120 are about 10 feet in length. As such, the wingspan 112 can be decreased by about 20 feet by folding the first and second wing tips 116, 120. When in the folded position, the aircraft 100 may comply with the ICAO Code E size limitations (e.g., under 65 meters), for example. In other examples, the first and second fixed wing portions 114, 118 and/or the first and second wing tips 116, 120 may be longer or shorter, and the first and/or second wing tips 116, 120 may be folded up, down, forward, aft or a combination thereof.

In the illustrated example, the first and second wings 104, 106 of the example aircraft 100 carry multiple control surfaces (e.g., aerodynamic surfaces, auxiliary airfoils, etc.) that are located on the first and second wings 104, 106 (e.g., along the leading and trailing edges of the first and second wings 104, 106). The control surfaces may be displaced or extended to change the aerodynamic lift of the aircraft 100 during takeoff or landing, for example. The control surfaces may include ailerons, flaperons, slats, spoilers, etc.

Figure 2:
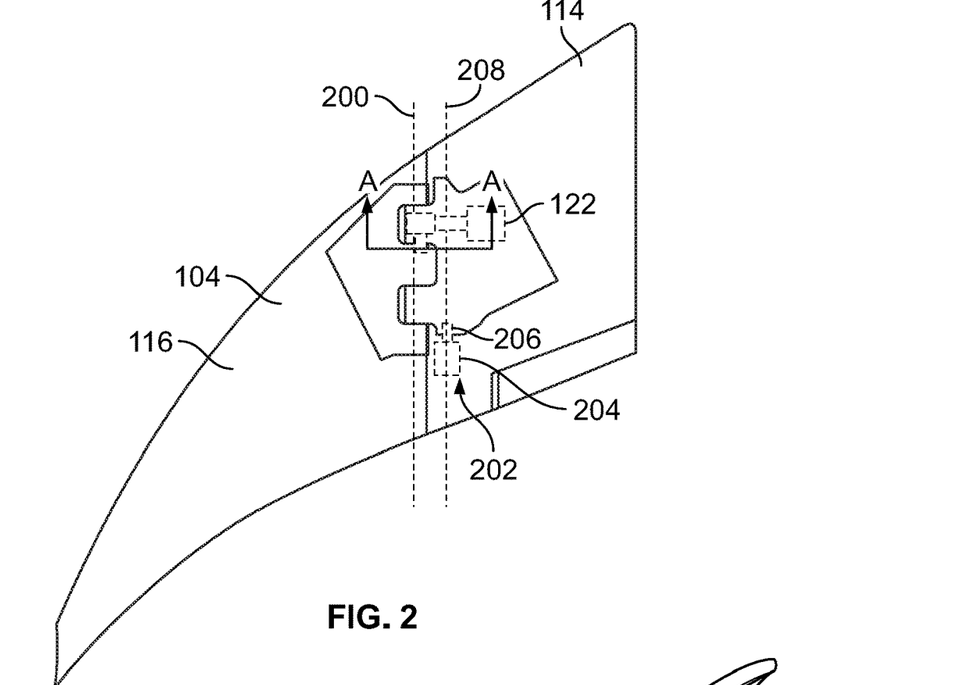
FIG. 2 is a top view of an example wing of the example aircraft of FIG. 1 showing an example wing tip.

The examples disclosed herein are described below in connection with the first wing 104. However, it is understood that any of the examples disclosed herein can be similarly applied to the second wing 106. FIG. 2 is a top view of the first wing 104 with the first wing tip 116 in the extended position. The first wing tip 116 is moveably coupled to the first fixed wing portion 114 about a hinge axis 200. The first wing tip 116 can be rotated between the extended position and a folded positon, illustrated in FIG. 3, via the first wing tip actuator 122. In some examples, the first wing tip actuator 122 is a geared rotary actuator (GRA). In other examples, another type of actuator may be implemented.

In some examples, the first wing 104 includes a latching or locking mechanism 202 that locks the first wing tip 116 in the extended position. The locking mechanism 202 may include an actuator 204 and a pin or lug 206 that is moved into one or more correcting pin or lug hole(s) in the first wing tip 116, which prevents the first wing tip 116 from rotating relative to the first fixed wing portion 114. In the illustrated example, the lug 206 is moveable along a latch axis 208. When the lug 206 is released or retracted, the first wing tip 116 can be rotated between the extended position and the folded position. In some examples, the actuator 204 moves multiple lugs along the latch axis 208. In other examples, multiple actuators may be provided to move respective lugs.

Figure 4A:
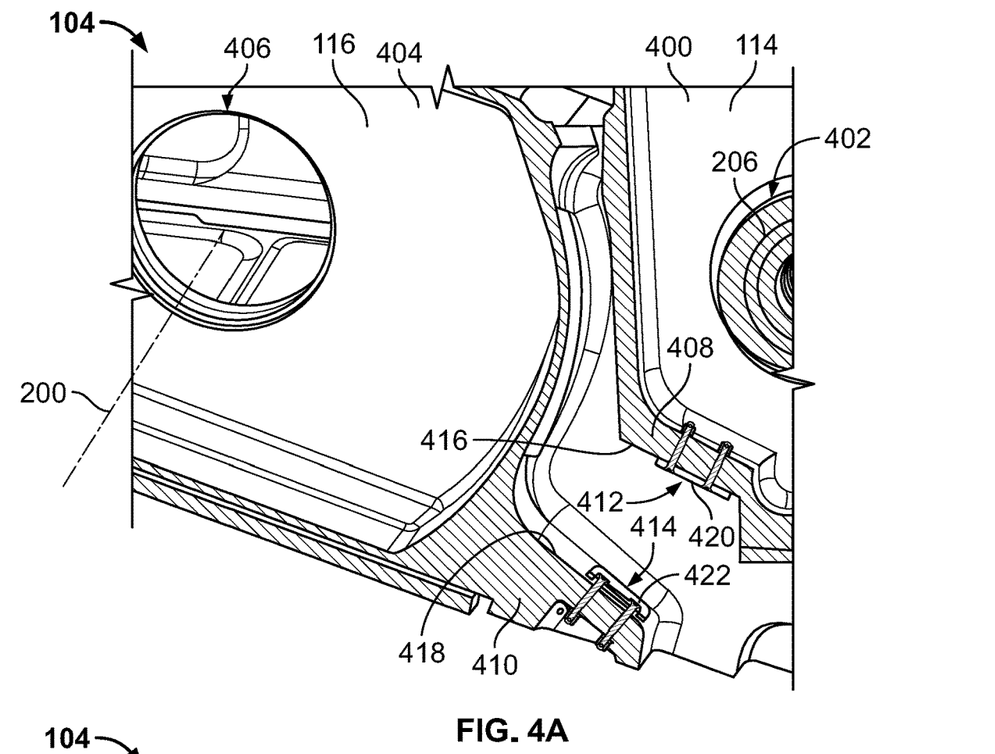
FIGS. 4A and 4B are perspective cross-sectional views of the example wing of FIG. 2 taken along line A-A of FIG. 2 showing a first example stop pad and a second example stop pad constructed in accordance with the teachings of this disclosure.
Figure 4B:
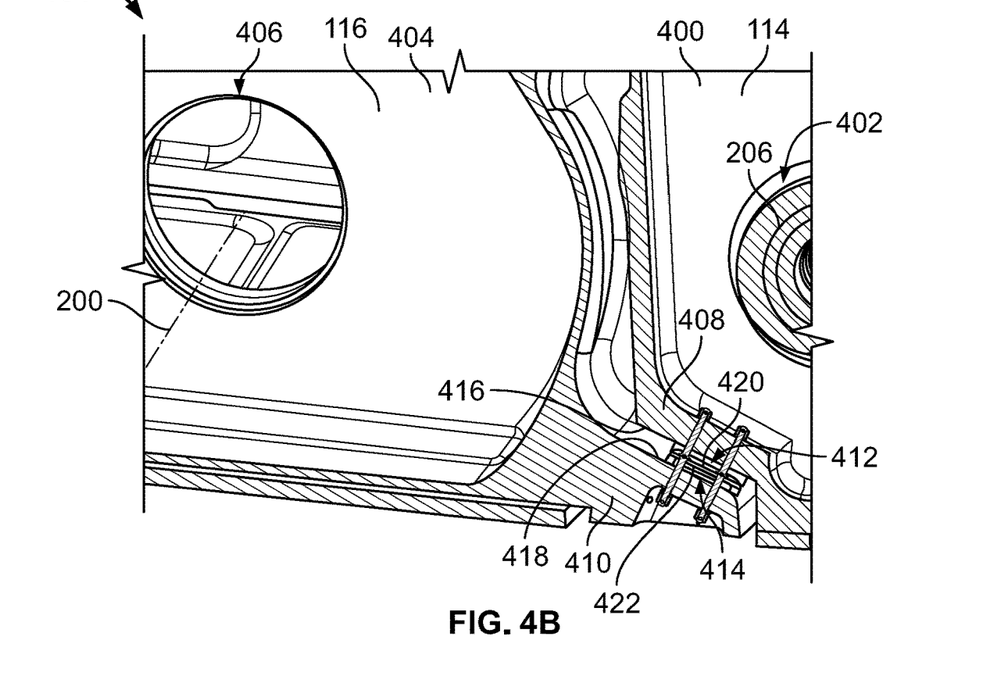

FIGS. 4A and 4B are perspective cross-sectional views of the first wing 104 taken along line A-A from FIG. 2. FIG. 4A shows the first wing tip 104 rotated upward from the extended position about 15°, and FIG. 4B shows the first wing tip 116 in the extended position. As shown in FIGS. 4A and 4B, the first fixed wing portion 114 includes a first rib 400, which is an internal support structure (e.g., a beam). The first rib 400 includes a lug opening 402 in which the lug 206 is disposed. Similarly, the first wing tip 116 includes a second rib 404. The second rib 404 includes a hinge opening 406 that receives a pin and/or another structure (e.g., a bearing) to form the hinge axis 200. The section of the second rib 404 behind the first rib 400 includes a lug opening (which can be seen in FIGS. 8 and 11). When the first wing tip 116 is in the extended position (the position in FIG. 4B), the lug opening in the second rib 404 is aligned with the lug opening 402 in the first rib 400, and the lug 206 may be inserted (e.g., via activation of the actuator 204 (FIG. 2)) into the lug opening in the second rib 404 to lock the first wing tip 116 in the extended position. In some examples, the first and second ribs 400, 404 are constructed of aluminum. In other examples, the first and/or second ribs 404 may be constructed of other materials.

As shown in FIGS. 4A and 4B, the first rib 400 of the first fixed wing portion 114 includes a first ledge 408, and the second rib 404 of the first wing tip 116 includes a second ledge 410. The first and second ledges 408, 410 may also be referred to hard down stops. The first and second ledges 408, 410 are positioned to prevent the first wing tip 116 from rotating downward (in the counter-clockwise direction in FIGS. 4A and 4B) beyond the extended position. In other words, as the first wing tip 116 is rotated downward from the folded position (or any other position between the folded position and the extended position), the second ledge 410 is moved closer to the first ledge 408 and would ultimately engage the first ledge 408 to prevent further rotation in the downward direction. However, this engagement may cause wear or damage to the first fixed wing portion 114 and/or the first wing tip 116 over time. Therefore, rather than allowing the first and second ledges 408, 410 to contact or engage each other directly, the example first wing 104 includes example stop pads (which may also be referred to as down stops or hard stop pads) constructed in accordance with the teachings of this disclosure.

In the illustrated example of FIGS. 4A and 4B, a first stop pad 412 is coupled to the first fixed wing portion 114 and a second stop pad 414 is coupled to the first wing tip 116. In particular, the first stop pad 412 is disposed on and coupled to a surface 416 of the first ledge 408, and the second stop pad 414 is disposed on and coupled to a surface 418 of the second ledge 410. The first stop pad 412 has a first contact surface 420 and second stop pad 414 has a second contact surface 422. When the first wing tip 116 is moved to the extended positon, as shown in FIG. 4B, the first and second stop pads 412, 414 engage each other. In particular, the first and second contact surfaces 420, 422 come into engagement with each other. As such, the first and second stop pads 412, 414 prevent direct contact or engagement of the first and second ledges 408, 410. Over time, one or both of the first or second stop pads 412, 414 may become worn and/or damaged. However, the first and second stop pads 412, 414 are relatively small, inexpensive to manufacture, and easily replaceable. Thus, the first and second stop pads 412, 414 reduce more expensive maintenance to the first wing 104 that would otherwise be required if the first and second stop pads 412, 414 were not included.

The first and second stop pads 412, 414 are also used to properly position or locate the first wing tip 116 in the extended position for alignment with the locking mechanism 202 (FIG. 2). For example, when the first wing tip 116 is moved to the extended position, the first and second stop pads 412, 414 form a stopping point. This stopping point should be configured (based on the heights or thicknesses of the first and second stop pads 412, 414) such that the lug opening (lug opening 800 shown in FIGS. 8 and 11) in the second rib 404 of the first wing tip 116 is aligned with the lug 206 along the latch axis 208. Proper alignment reduces or prevents excessive wear of the openings and the lug 206.

Figure 5:
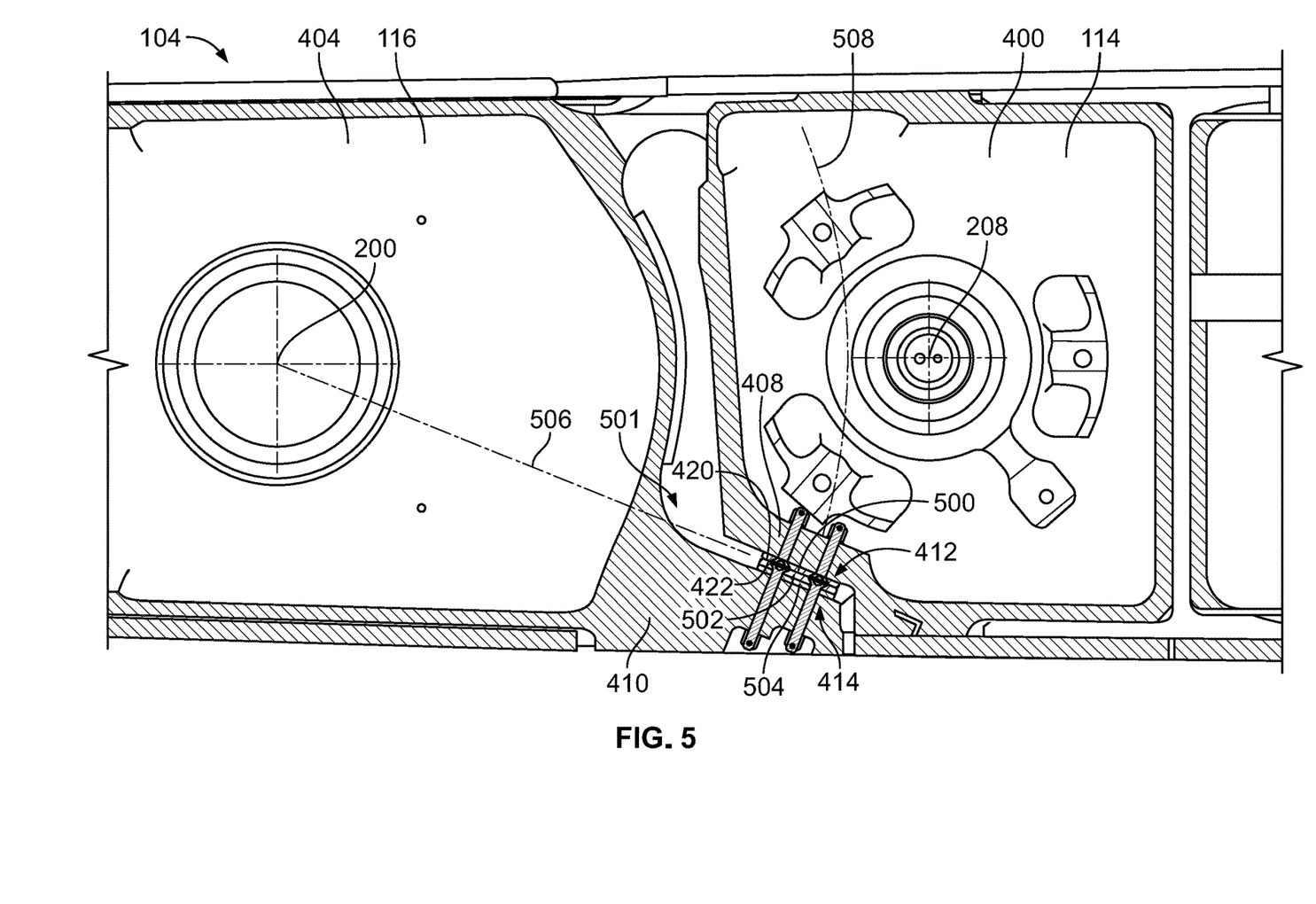
FIG. 5 is a side cross-sectional view of the example wing of FIG. 2 taken along line A-A of FIG. 2 and showing the first and second example stop pads of FIGS. 4A and 4B.

FIG. 5 is a side cross-sectional view of the first wing 104 taken along line A-A of FIG. 2. In FIG. 5 the first wing tip 116 is in the extended position and the first and second stop pads 412, 414 are engaged (the same position as shown in FIG. 4B). The first and second stop pads 412, 414 can be coupled to the first fixed wing portion 114 and the first wing tip 116, respectively, via one or more threaded fasteners, as disclosed in further detail herein. FIG. 5 shows the first rib 400 of the first fixed wing portion 114 and the latch axis 208 (which extends into the figure). FIG. 5 also shows the second rib 404 of the first wing tip 116 and the hinge axis 200 (which extends into the figure) about which the first wing tip 116 rotates. As shown in FIG. 5, the first and second stop pads 412, 414 are disposed within a cavity 501 (e.g., the wing loft) formed between the first wing tip 116 and the first fixed wing portion 114. As such, the first and second stop pads 412, 414 do not extend outward into the atmosphere where they may otherwise cause drag.

As shown in the illustrated example of FIG. 5, the first stop pad 412 includes a first wear plate 500. The first contact surface 420 of the first stop pad 412 corresponds to the top surface of the first wear plate 500. The second stop pad 414 includes a second wear plate 502 (e.g., a layer). The second contact surface 422 of the second stop pad 414 corresponds to the top surface of the second wear plate 502. In the illustrated example, the second stop pad 414 also includes a filler plate 504, which is disclosed in further detail herein.

When the first wing tip 116 is in the extended position (the position shown in FIG. 5), the first and second contact surfaces 420, 422 contact each other along a contact plane 506. In the illustrated example, the contact plane 506 formed between the first and second contact surfaces 420, 422 is coplanar with the hinge axis 200. The contact plane 506 is also perpendicular to a radial arc 508 of a hinge line (e.g., an arc along which the second stop pad 414 moves). As a result, most (if not all) of the movement between the first wing tip 116 and the first fixed wing portion 114 is perpendicular (normal) to the first and second stop pads 412, 414 and, thus, is imparted as compressive forces in the first and second stop pads 412, 414. The first and second stop pads 412, 414 experience compressive loads while the first wing tip actuator 122 is driving the wing tip downward during the locking/unlocking process. Also, when then locking mechanism 202 is engaged, the first and second stop pads 412, 414 can remain engaged and experience compressive forces due to wing bending/deflection. In some examples, due to wing bending/deflection, the first and second stop pads 412, 414 may be moved away from each other. The first and second stop pads 412, 414 are relatively rigid and designed to withstand (react to) high compressive forces during normal operating conditions (e.g., during the locking process, from wing deflection during flight, etc.). In particular, the first and second stop pads 412, 414 are constructed of materials that may perform in the elastic range (and elastically compress) during normal operating loads (but may yield when compression exceeds normal operating levels, as disclosed in further detail below). This coplanar arrangement minimizes the amount of shearing (lateral or coplanar) movement between the first and second stop pads 412, 414 and, thus, minimizes wear between the first and second stop pads 412, 414. While some lateral or sideways movement may occur due to wing deflection, a majority of the forces are seen as compressive forces. In other examples, the first and second stop pads 412, 414 can be configured to contact each other along another plane that does not intersect the hinge axis 200. For example, the contact plane 506 may be ±15° coplanar with the hinge axis 200.

While most of the loads experienced by the first and second stop pads 412, 414 are compressive forces, some shear forces due to wing bending may occur (e.g., during flight, while the wings bounce during taxiing, etc.). In particular, wing deflection moves the first and second stop pads 412, 414 toward or away from each other and results in a shear force acting in the inboard and outboard directions. The first and second contact surface 420, 422 are designed to slip (i.e., allow relative movement in the planar direction). Therefore, the first and second wear plates 500, 502 can be constructed of wear resistant materials to reduce the amount of wear that occurs. However, two different materials are chosen to bias the wear to one of the wear plates 500, 502. For example, the first wear plate 500 can be constructed of a harder material than the second wear plate 502. Thus, in this example, the first wear plate 500 is considered a permanent side and the second wear plate 502 is considered the sacrificial (wearable) side. In some examples, the first wear plate 500 is constructed of stainless steel (e.g., Custom 465 (UNS S46500)), and the second wear plate 502 is constructed of a copper-nickel-tin alloy (e.g., Cu-15Ni-8Sn (UNS 72900)). As a result, over time, the second wear plate 502 may wear or erode, whereas the first wear plate 500 may incur little or no wear. The main cause of wear is from wing bending, which causes shear loads that may cause the first and second wear plates 500, 502 to slide against each other. When the second wear plate 502 is worn a certain amount, the second stop pad 414 can be replaced. In other examples, the first and/or second stop pads 412, 414 may be constructed of other types of materials.

In some examples, the second ledge 410 on the first wing tip 116 is easier to access for maintenance than the first ledge 408 on the first fixed wing portion 114. Therefore, by disposing the softer (sacrificial) wear plate on the second ledge 410, the worn out stop pad can be quickly and easily replaced. However, in other examples, the first wear plate 500 of the first stop pad 412 can be constructed of the softer (sacrificial) material, such that the second stop pad 412 is the stop pad that wears out and is replaced.

Figure 6:
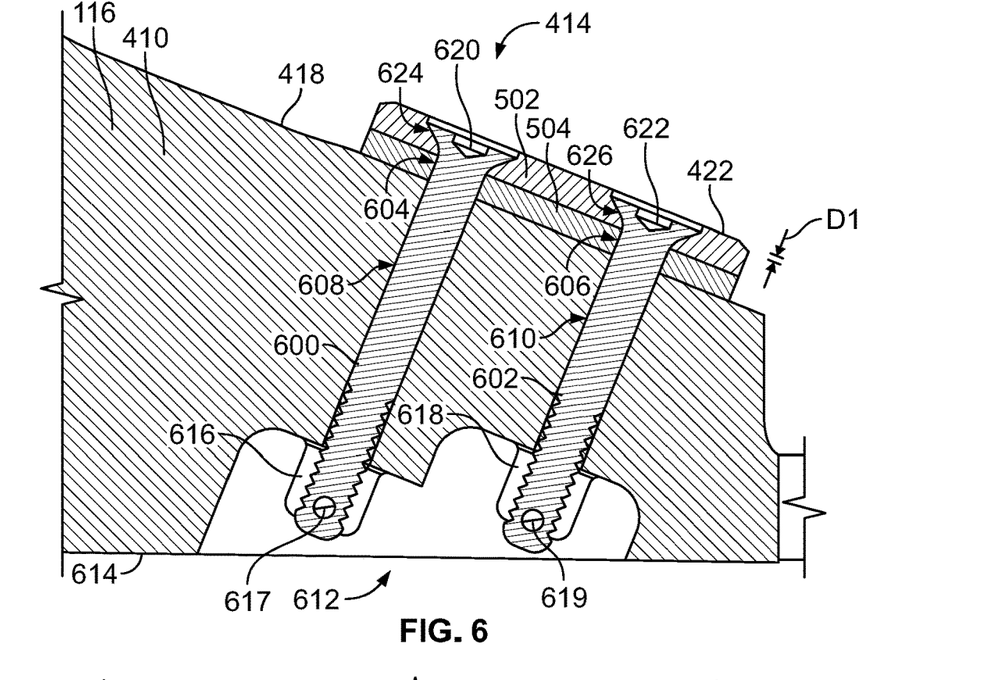
FIG. 6 is an enlarged cross-sectional view of the second example stop pad from FIG. 5.
Figure 7:
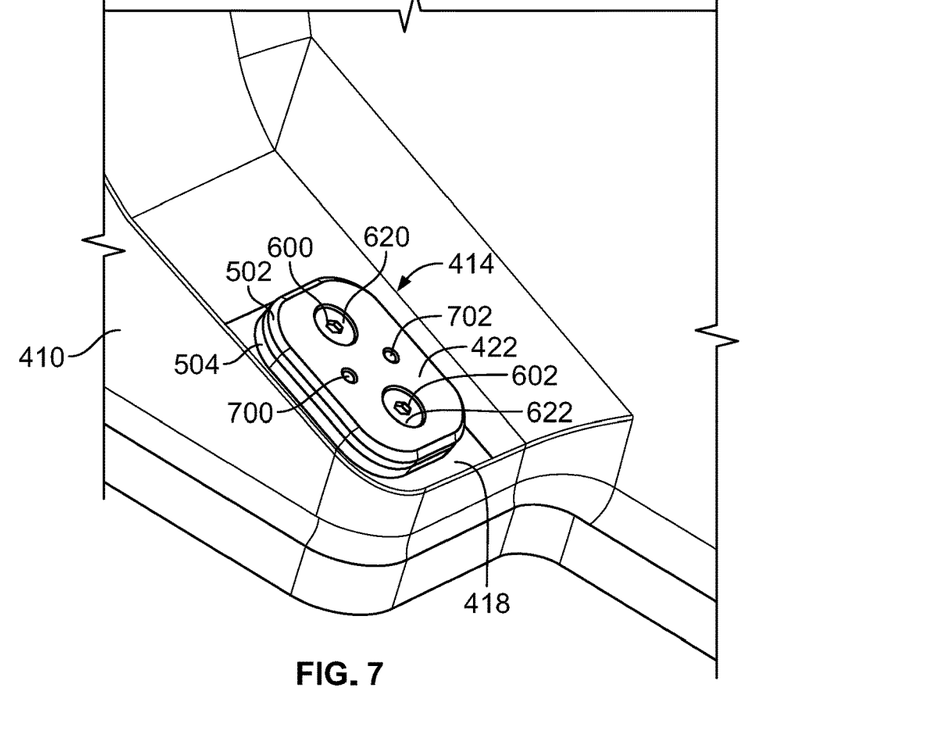
FIG. 7 is a perspective view of the second example stop pad from FIGS. 4A-6.

FIG. 6 is an enlarged cross-sectional view of the second stop pad 414 from FIG. 5, and FIG. 7 is a perspective view of the second stop pad 414 on the second ledge 410. As disclosed above, the second stop pad 414 includes the second wear plate 502 and the filler plate 504. The filler plate 504 has substantially the same size foot print (width and length) as the second wear plate 502. In the illustrated example, the filler plate 504 is disposed on and in contact with the surface 418 of the second ledge 410 of the first wing tip 116, and the second wear plate 502 is disposed on and in contact with the filler plate 504. As such, that the filler plate 504 is disposed between the surface 418 of the first wing tip 116 and the second wear plate 502.

In some examples, the filler plate 504 is constructed of a frangible material, which yields or non-elastically deforms under high force to absorb peak loads and reduce impact. In some examples, the filler plate 504 is constructed of a material having a yield between 40 to 50 kilopounds per square inch (ksi). The frangible material may be any material that has a yield that is less than the yield of the first and second ribs 400, 404 (e.g., less than 7050 aluminum) but high enough to not yield under normal operating conditions (e.g., from wing deflection during flight, from the force of the first wing tip 116 being driven downward by the first wing tip actuator 122, etc.). As such, in the event of a high impact force outside of the normal operating range, the filler plate 504 yields before the first and second ribs 400, 404 yield. In some examples, the filler plate 504 is constructed of an aluminum-silicon bronze alloy (e.g., C64200). Therefore, in some examples, the second wear plate 502 is constructed of a harder material (e.g., copper-nickel-tin alloy) than the filler plate 504. The frangible material of the filler plate 504 is designed to yield under loads that are higher than the normal operating load of the first wing tip actuator 122 (FIGS. 1 and 2) and/or any load incurred during normal operation. In particular, the filler plate 504 may be used to absorb high impact force that may occur between the first wing tip 116 and the first fixed wing portion 114. For example, in the event of a free-fall event of the first wing tip 116, the first and second ledges 408, 410 are pushed together with a relatively high force. A free-fall event is an on-ground event where the first wing tip 116 accidently falls to the extended position (as opposed to being moved down at control speed with the first wing tip actuator 122). When such a high force event occurs, the filler plate 504 yields (e.g., is compressed and squeezed outward from between the second wear plate 502 and the surface 418 of the second ledge 410). This yielding distributes the load and dampens the impact between the first wing tip 116 and the first fixed wing portion 114, thereby reducing or eliminating expensive damage to the surrounding structure.

As disclosed above, in some examples the filler plate 504 is constructed of an aluminum-silicon bronze alloy, the second wear plate 502 is constructed of a copper-nickel-tin alloy, and the first wear plate 500 is constructed of stainless steel. These materials are galvanically compatible with the material of the first and second ribs 400, 404 (e.g., aluminum). In other examples, the filler plate 504, the second wear plate 502, and/or the first wear plate 500 may be constructed of other materials.

As disclosed above, the second stop pad 414 can be coupled to the surface 418 of the second ledge 410 via one or more threaded fasteners. For example, as illustrated in FIGS. 6 and 7, the second stop pad 414 is coupled to the surface 418 of the first wing tip 116 via a first bolt 600 and a second bolt 602. As shown in FIG. 6, the first and second bolts 600, 602 extend through respective first and second openings 604, 606 in the second stop pad 414 (through both the second wear plate 502 and the filler plate 504) and through respective first and second openings 608, 610 in the second ledge 410. In the illustrated example, the ends of the first and second bolts 600, 602 extend into a cavity 612 (e.g., a notch, a groove, etc.) formed in a bottom surface 614 of the first wing tip 116. A first nut 616 is coupled to (threaded onto) the first bolt 600 and a second nut 618 is coupled to (threaded onto) the second bolt 602. In some examples, first and second cotter pins 617, 619 may be inserted into the first and second bolts 600, 602 and/or the first and second nuts 616, 618, respectively, to prevent the first and second nuts 616, 618 from being rotated off of the respective first and second bolts 600, 602. In other examples, cotter pins may not be used. Instead, in some examples, relatively taller, stiffer nuts may be use that can accommodate higher preloads.

Figure 8:
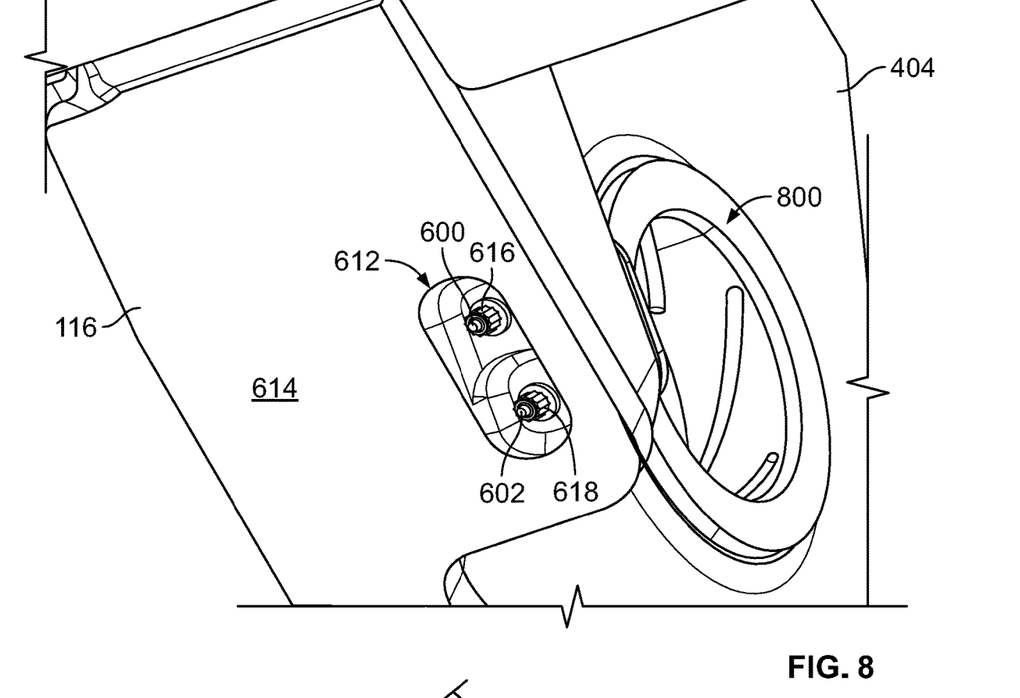
FIG. 8 is a bottom view of the example wing tip of FIG. 2.

Referring briefly to FIG. 8, FIG. 8 is a perspective view of the bottom surface 614 of the first wing tip 116 showing the cavity 612. As shown, the ends of the first and second bolts 602, 602 and the first and second nuts 616, 618 are disposed within the cavity 612, which helps reduce drag along the first wing tip 116. In some examples, the cavity 612 is left uncovered, which enables easy access to the first and second nuts 616, 618 (for easy removal of the second stop pad 412). In other examples, the cavity 612 may be filled with a material (e.g., insulation, a foam filler, etc.) to reduce or eliminate any potential drag caused by the cavity 612. Also shown in FIG. 8 is a lug opening 800 formed in the second rib 404. When the first wing tip 116 is in the extended position (e.g., as shown in FIGS. 4B and 5), the lug 206 (FIG. 2) may be inserted into the lug opening 800 to lock the first wing tip 116 in the extended position and prevent the first wing tip 116 from rotating.

Turning back to FIGS. 6 and 7, the first and second bolts 600, 602 have respective first and second heads 620, 622. In the illustrated example, the first and second heads 620, 622 are tapered. However, in other examples, the first and second bolts 600, 622 may have differently shaped heads. To help reduce or eliminate contact between the first wear plate 500 (FIG. 5) and the first and second heads 620, 622, the first and second heads 620, 622 are countersunk into the second stop pad 414. In particular, as shown in FIG. 6, the first opening 604 includes a first tapered portion 624 in the second wear plate 502 that receives the first head 620 of the first bolt 600, and the second opening 606 includes a second tapered portion 626 that receives the second head 622 of the second bolt 602. As shown in FIG. 6, the first and second tapered portions 624, 626 are sized such that the tops of the first and second heads 620, 622 are countersunk below the second contact surface 422 (i.e., the top surface) of the second wear plate 502. In the illustrated example, the first and second heads 620, 622 are countersunk a depth of D1. As such, as the second contact surface 422 is worn down, the first and second heads 620, 622 are not engaged (unless the second wear plate 502 is worn down a depth of more than D1).

In some examples, one or more wear indicators may be provided to indicate an amount of wear that has occurred to the second wear plate 502. In some examples, one or more features are formed in the second contact surface 422 to indicate an amount of wear to the second wear plate 502. For example, as illustrated in FIG. 7, the second wear plate 502 includes a first dimple 700 (e.g., an indent, a recess, a groove, etc.) and a second dimple 702 formed in the second contact surface 422. As the second wear plate 502 wears or erodes, the depth of the first and second dimples 700, 702 decreases. This can serve as an indicator of the amount of wear to a technician. For example, once the first and second dimples 700, 702 are almost gone or completely gone, a technician may know to replace the second wear plate 502 and/or the entire second stop pad 414. In some examples, the first and second dimples 700, 702 have a depth that is less than D1 (i.e., the depth to the first and second heads 620, 622), so that the first and second dimples 700, 702 indicate to replace the second wear plate 502 before the first and second heads 620, 622 begin to protrude.

In the illustrated example, the first and second dimples 700, 702 are spaced apart from each other and disposed between the first and second bolts 600, 602. However, in other examples, the first and/or second dimples 700, 702 may be disposed in other locations on the second contact surface 422 of the second wear plate 502. Further, while in the illustrated example two dimples are utilized, in other examples, the second wear plate 502 may include more or fewer dimples. For example, only one dimple (e.g., the first dimple 700) may be utilized. Also, in other examples, other types of wear indicators may be used in addition to or as an alternative to the first and second dimples 700, 702, such as a pin extending upward, a color changing material, etc.

As disclosed above, in flight, shear forces due to wing being may occur. The first and second contact surfaces 420, 422 are designed to slip, thereby allowing relative movement in the contact plane 506 (FIG. 5) as the force (that is normal to the surface) overcomes the static friction. To sustain the high frequency of this occurrence and prevent fatigue cracking of the materials and the first and second bolts 600, 602, the first and second bolts 600, 602 may be implemented as highly pre-loaded (high strength) fasteners (e.g., Inconel fastener type BACB31G). Further, the first and second bolts 600, 602 may be torqued down relatively tightly. The compression force exerted by the first and second bolts 600, 602 tightly clamps the second wear plate 502 and the filler plate 504 to the surface 418 to prevent the second wear plate 502 and the filler plate 504 from sliding (slipping) relative to each other. As such, the second wear plate 502 and the filler plate 504 remain rigidly clamped during operation. Further, by highly pre-loading the first and second bolts 600, 602, the first and second bolts 600, 602 do not experience as much (if any) of the effects from relatively lower fatigue loads. Moreover, high durability can be achieved through high pre-loading rather than requiring match drilled openings. In other words, the first and second openings 608, 610 are toleranced such that they can be drilled separately, rather than using a more expensive and complex match drilling process. The high pre-loading of the first and second bolts 600, 602 ensures the second stop pad 414 remains in place even though the tolerance of the openings 608, 610 may be looser. This ensures the second stop pad 414 can be easily replaced and reduces the overall manufacturing costs.

In some examples, using two bolts helps to prevent rotation and/or lateral movement of the second stop pad 414 relative the surface 418. However, in other examples, only one bolt may be utilized (e.g., only the first bolt 600). In still other examples, more than two bolts may be utilized. In other examples, the second stop pad 414 can be coupled to the first wing tip 116 via one or more other chemical and/or mechanical fastening mechanisms (e.g., one or more screws, an adhesive, welding, etc.).

In some examples, the filler plate 504 is selected from a plurality of different filler plates having different thickness (e.g., 0.065 inches (in), 0.070 in, 0.075 in, etc.) depending on a desired position or location of the second wear plate 502. For example, to position the second wear plate 502 closer to the surface 418, a thinner filler plate can be selected, whereas to position the second wear plate 502 further from the surface 418, a thicker filler plate can be selected. The position of the second wear plate 502 affects the location of the contact plane 506 (FIG. 5) and, thus, affects the position of the first wing tip 116 in the extended position. An appropriate filler plate may be selected that results in first wing tip 116 being in a position where the lug opening 800 (FIG. 8) is aligned (i.e., coaxial) with the lug 206 when the first wing tip 116 is in the extended position (e.g., and while being driven downward by the first wing tip actuator 122) during the locking/unlocking process. As such, the extended position of the first wing tip 116 can be easily adjusted by replacing the filler plate with another filler plate having a different thickness. Thus, the manufacturing tolerances of the positions of the first and second ledges 408, 410 can be increased (because selection of a filler plate can be easily used to affect the position of the first wing tip 116), which results in decreased manufacturing costs. Further, using an adjustable filler plate enables the first wing tip 116 to be used on a wing of another aircraft, for example, because a different filler plate may be used to finely adjust the final resting/extended position of the first wing tip 116.

The thickness of the filler plate 504 can also take into account the amount of plastic deformation experienced during the rigging process (e.g., when the first and second stop pads 412, 414 are initially installed). For example, during rigging, a relatively large load may be applied to the first wing tip 116 that is greater than a typical load experienced during flight. Initially, the first and second contact surfaces 420, 422 may not be completely coplanar. However, upon application of this large load, the filler plate 504 may yield (i.e., plastically deform, compress), which enables the second wear plate 502 to settle in a position where the first and second contact surfaces 420, 422 become coplanar with each other along the hinge axis 200. The frangible material of the filler plate 504 continues to yield until a large enough area of contact occurs that overcomes the force applied. At this point, the first and second stop pads 412, 414 are considered coplanar or substantially coplanar (e.g., ±0.1°). The original rectangular cross-section of the filler plate 504 may be formed into a trapezoidal shape (depending on the initial alignment between the first and second wear plates 500, 502). Then (after or while the load is still being applied), the first and second nuts 616, 618 may be re-tightened to re-establish the fastener pre-load (e.g., the elastic compression around the first and second heads 620, 622 of the first and second bolts 600, 602) to account for any loss due to the inelastic yielding of the filler plate 504. In some examples, this process enables manufacturing to build the parts with looser tolerances. In other examples, instead of plastically deforming the filler plate 504 during the rigging process, the surfaces 416, 418 of the first and second ledges 408, 410 may be mapped, and a hydraulic press may be used to plastically deform the filler plate 504 into the correct thickness and shape. Then, the pre-molded filler plate 504 can be coupled to the surface 418 of the second ledge 410 along with the second wear plate 502, which results in the first and second contact surfaces 420, 422 being coplanar with each other.

Figure 9:
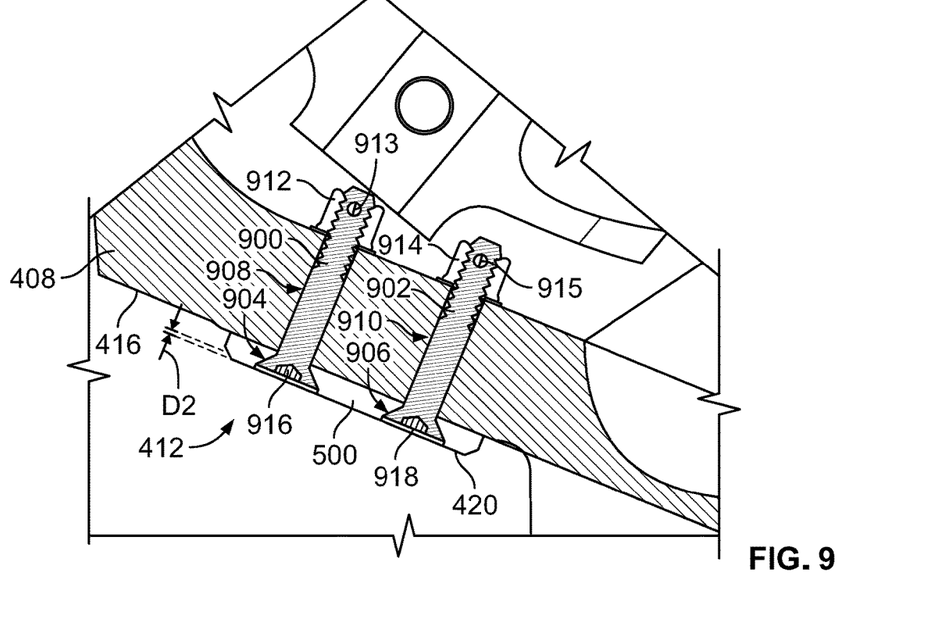
FIG. 9 is an enlarged cross-sectional view of the first example stop pad from FIG. 5.
Figure 10:
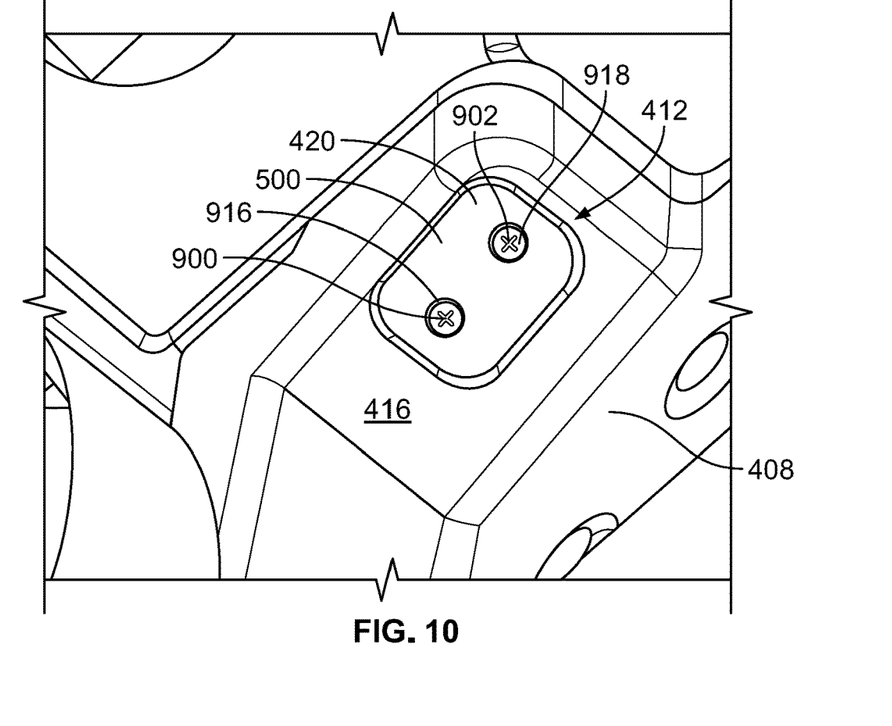
FIG. 10 is a perspective view of the first example stop pad from FIGS. 4A, 4B, 5, and 9.

FIG. 9 is an enlarged cross-sectional view of the first stop pad 412, and FIG. 10 is a perspective view of the first stop pad 412 on the first ledge 408. As disclosed above, the first stop pad 412 includes the first wear plate 500. However, unlike the second stop pad 414, the first stop pad 412 in this example does not include a filler plate. Instead, in the illustrated example, the first wear plate 500 is disposed on and in contact with the surface 416 of the first ledge 408. In other examples, the first stop pad 412 may include a filler plate similar to the second stop pad 414.

As illustrated in FIGS. 9 and 10, the first stop pad 412 is coupled to the surface 416 of the first ledge 408 via a first bolt 900 and a second bolt 902. As shown in FIG. 9, the first and second bolts 900, 902 extend through respective first and second openings 904, 906 in the first wear plate 500 and through respective first and second openings 908, 910 in the first ledge 408. A first nut 912 is coupled to (threaded onto) the end of the first bolt 900 and a second nut 914 is coupled to (threaded onto) the end of the second bolt 902. In some examples, first and second cotter 913, 915 pins may be inserted into the first and second bolts 900, 902 and/or the first and second nuts 912, 914, respectively, to prevent the first and second nuts 912, 914 from being rotated off of the respective first and second bolts 900, 902. In other examples, cotter pins may not be used. Instead, in some examples, relatively taller, stiffer nuts may be use that can accommodate higher pre-loads.

As illustrated in FIGS. 9 and 10, the first and second bolts 900, 902 have respective first and second heads 916, 918. In the illustrated example, the first and second heads 916, 918 are tapered. However, in other examples, the first and second bolts 916, 918 may have differently shaped heads. In the illustrated example, the first and second heads 916, 918 are countersunk into the first wear plate 500. In particular, as shown in FIG. 9, the first opening 904 in the first wear plate 500 is tapered to receive the first head 916 of the first bolt 900, and the second opening 906 in the first wear plate 500 is tapered to receive the second head 918 of the second bolt 902. As shown, the first and second openings 904, 906 are sized such that the tops of the first and second heads 916, 918 are disposed below the first contact surface 420 (i.e., the top surface) of the first wear plate 500. In the illustrated example, the first and second heads 916, 918 are countersunk a depth of D2. As such, if any wearing occurs in the first contact surface 420, the first and second heads 916, 918 are not engaged (unless the first wear plate 500 is worn down a depth of more than D2). In some examples, D2 is the same as D1. In other examples, D2 can be less than D1, because most (if not all) of the wear occurs in the second wear plate 502.

As shown in FIG. 10, in this example, the first wear plate 500 does not include any dimples for wear indication. As disclosed above, in some examples, the first wear plate 500 is constructed of a harder material than the second wear plate 502 (FIG. 5). For example, the first wear plate 500 may be constructed of stainless steel, while the second wear plate 502 may be constructed of a softer material, such as a copper-nickel-tin alloy. As such, most (if not all) of the wear occurs in the second wear plate 502. Therefore, the first wear plate 500 may not need to be replaced. However, in other examples, one or more dimples may still be included in the first contact surface 420 in case wear does occur.

In some examples, using two bolts helps to prevent rotation and/or lateral movement of the first stop pad 412 relative the surface 416. However, in other examples, only one bolt may be utilized (e.g., only the first bolt 900). In still other examples, more than two bolts may be utilized. In other examples, the first stop pad 412 can be coupled to the first fixed wing portion 114 via one or more other chemical and/or mechanical fastening mechanisms (e.g., one or more screws, an adhesive, welding, shrink fit, etc.).

In some examples, the second stop pad 414 may not include the filler plate 504. Instead, the second wear plate 502 may be coupled directly to the second ledge 410. In some examples, the second wear plate 502 is selected from a plurality of wear plates having varying thickness. In some examples, the second wear plate 502 may be constructed of a frangible material. As a result, the second wear plate 502 may yield under forces outside of normal operating conditions (to reduce damage to the parts of the first wing 104), while still operating to absorb wear during normal operating conditions. Therefore, in some examples, the second wear plate 502 may be implemented without a frangible filler plate. In other examples, the second wear plate may be constructed of a relatively hard material (non-frangible) that may be coupled directly to the second ledge 410. Additionally or alternatively, one or more shims or plates of non-frangible material may disposed between the second wear plate 502 (with or without a frangible filler plate) and the second ledge 410 to adjust the location of the second wear plate 502 relative to the second ledge 410.

Figure 11:
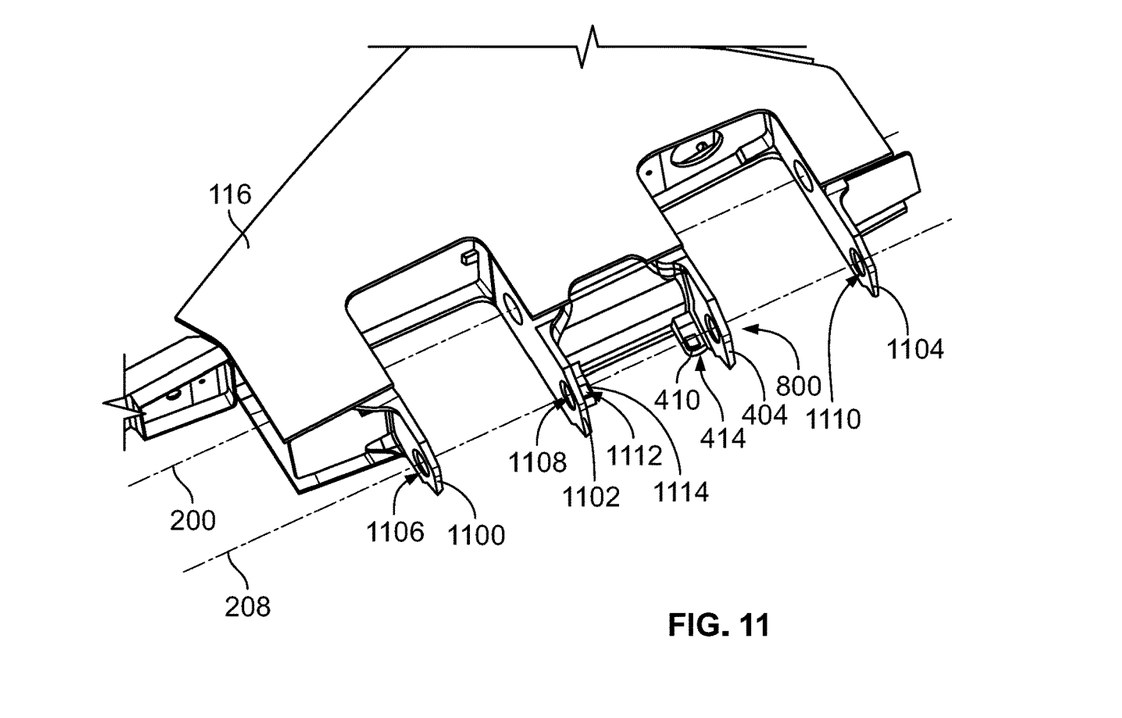
FIG. 11 is a top perspective view of an inboard side of the example wing tip of FIG. 2 showing a location of the example second stop pad of FIGS. 4A and 4B.

FIG. 11 is a perspective view of the inboard side of the first wing tip 116. The first wing tip 116 is rotatable about the hinge axis 200. As illustrated in FIG. 11, the first wing tip 116 includes the second rib 404 with the lug opening 800. In the illustrated example, the first wing tip 116 includes three additional ribs 1100, 1102, 1104 with corresponding lug openings 1106, 1108, 1110 to receive one or more pin(s) or lug(s) for locking the first wing tip 116 in the extended position. The lug openings 800, 1106, 1108, 1110 are aligned along the latch axis 208.

In the illustrated example, the second stop pad 414 is coupled to the second ledge 410, which extends from the second rib 404. In some examples, one or more additional stop pads may be coupled to one or more locations on the first wing tip 116 to contact corresponding stop pads on the first fixed wing portion 114 (FIG. 1). For example, as shown in FIG. 11, a third stop pad 1112 is coupled to a ledge 1114 extending from the rib 1102. The third stop pad 1112 may be identical to the second stop pad 414. For example, the third stop pad 1112 may include a third wear plate (forming a third contact surface) and a second filler plate.

Figure 12:
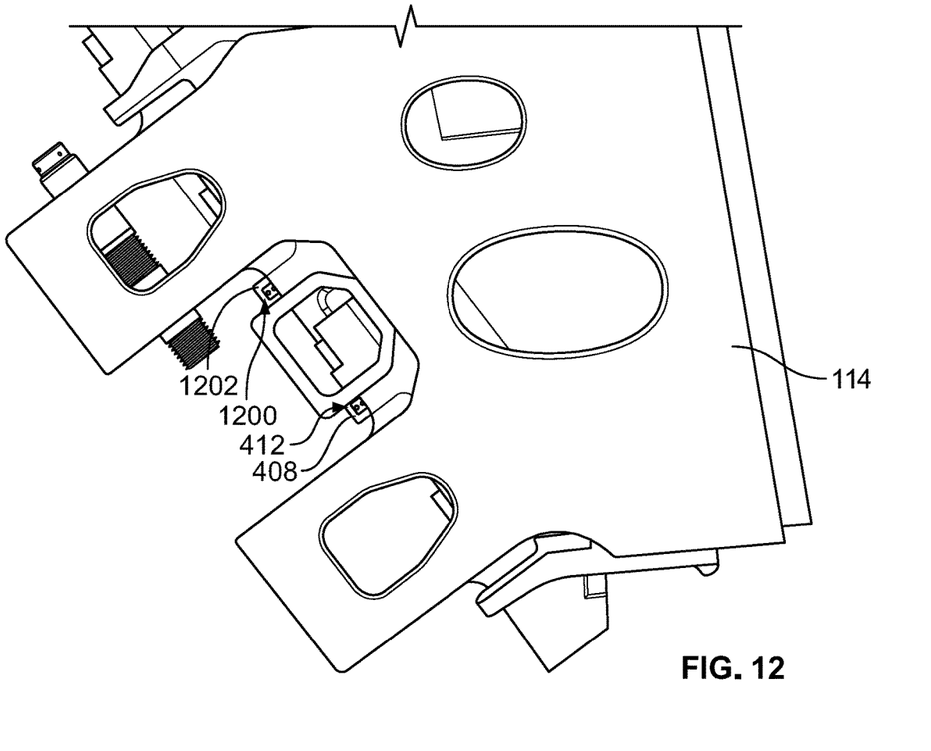
FIG. 12 is a bottom perspective view of an outboard side of the example wing of FIG. 2 showing a location of the example first stop pad of FIGS. 4A and 4B.

FIG. 12 is a perspective view of the outboard side of the first fixed wing portion 114. As shown in FIG. 12, the first stop pad 412 is coupled to the first ledge 408. The first stop pad 412 is positioned to be engaged by the second stop pad 414 (FIG. 11) when the first wing tip 116 is in the extended position. In the illustrated example, a fourth stop pad 1200 is coupled to a fourth ledge 1202 on the first fixed wing portion 114. The fourth stop pad 1200 may be identical to the first stop pad 412. For example, the fourth stop pad 1200 may include a fourth wear plate (forming a fourth contact surface). The fourth stop pad 1200 is positioned to be engaged by the third stop pad 1112 (FIG. 11) when the first wing tip 116 is in the extended position. In other words, the third and fourth contact surfaces are to engage each other when the first wing tip 116 is in the extended positon.

Figure 13:
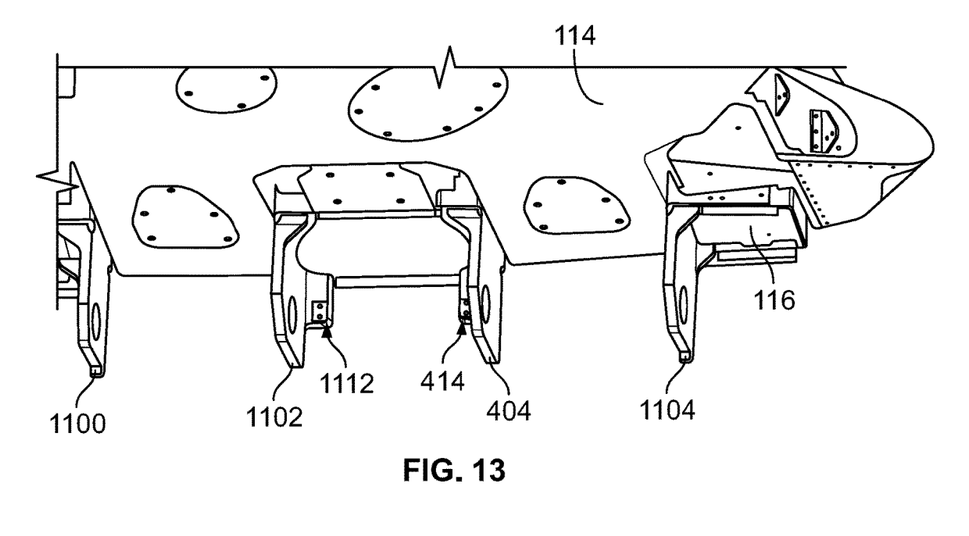
FIG. 13 is a bottom view of the example wing from FIG. 2 with the example wing tip in the folded position and showing the location of the example second stop pad of FIGS. 4A and 4B.

FIG. 13 is a bottom view of the first wing 104 in which the first wing tip 116 is in the folded position. When the first wing tip 116 is in the folded position, the ribs 404, 1100, 1102, 1104 extend downward from the bottom side of the first fixed wing portion 114 and are thereby easily accessible by a technician or operator stranding under the first wing 104. For example, when the 100 aircraft is on the ground (e.g., at a gate), the first wing tip 116 may be raised to the folded position. Then, a technician can walk under the first wing 104 and inspect the condition of the second and third stop pads 414, 1112 on the corresponding ribs 404, 1102. If either of the stop pads 414, 1112 is worn down (e.g., as indicated when the dimples 700, 702 are almost gone or completely gone), the technician can easily replace the corresponding wear plates and/or the entire stop pads.

While in the illustrated example of FIGS. 11-13 two pairs of stop pads are provided, in other examples, only one pair of stop pads may be implemented. For example, only the first and second stop pads 412, 414 may be utilized. In other examples more than two pairs of stop pads may be implemented, and the stop pads may be disposed in other locations on the first wing tip 116 and/or the first fixed wing portion 114.

Figure 14:
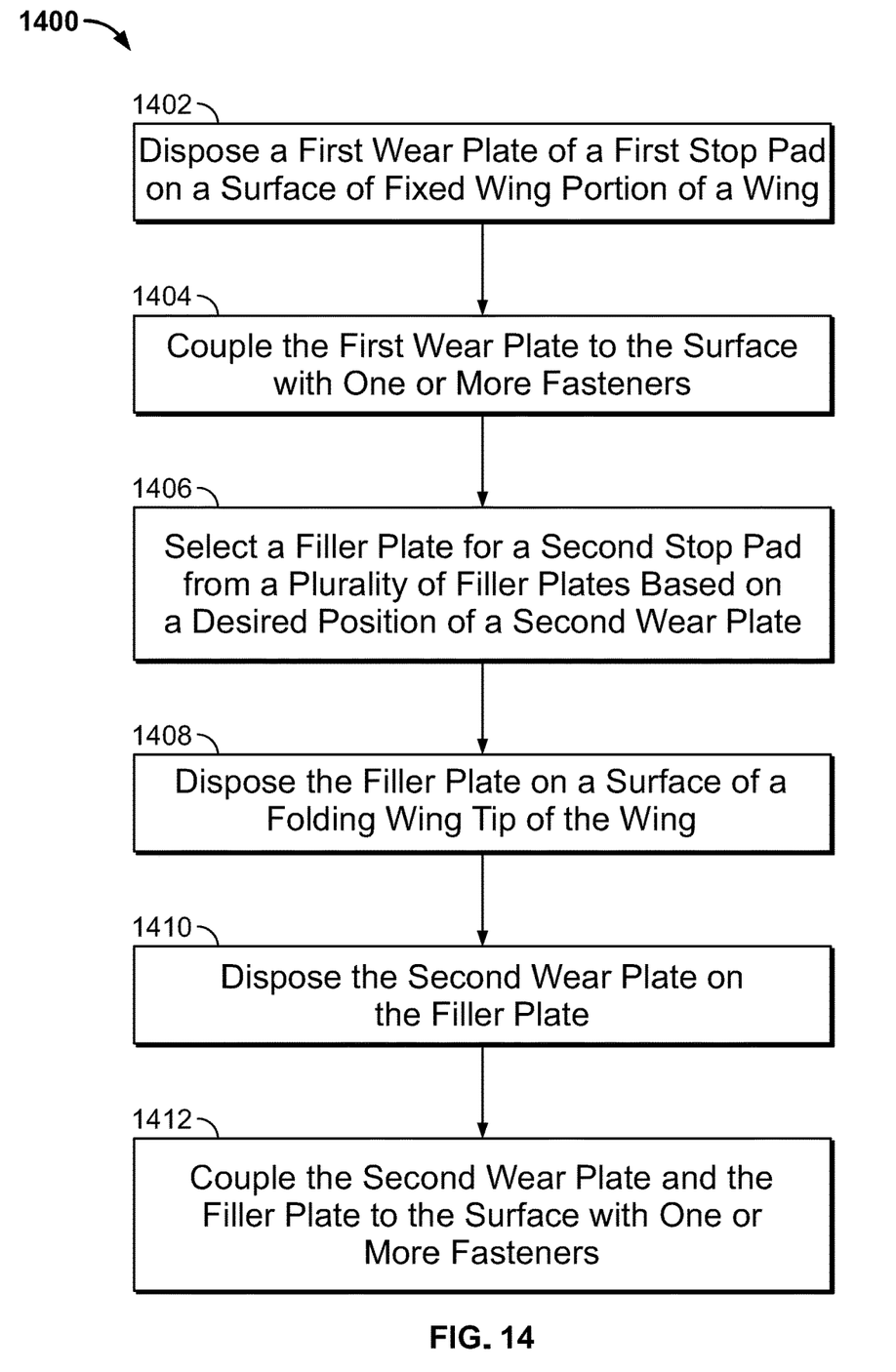
FIG. 14 is a flowchart representative of an example method of installing one or more stop pads on a wing of an aircraft.

FIG. 14 is a flowchart illustrating an example method 1400 for installing one or more example stop pads on an aircraft wing having a folding wing tip. The example method 1400 may be performed by a human and/or by an automated machine. Any of the example blocks in FIG. 14 can be rearranged, combined, omitted, replaced, or repeated. The example method 1400 is described in connection with the first and second stop pads 412, 414 of FIGS. 4A-13.

At block 1402, the first wear plate 500 of the first stop pad 412 is disposed on the surface 416 of the first fixed wing portion 114 of the first wing 104. At block 1404, the first wear plate 500 is coupled to the surface 418 via one or more fasteners. For example, as shown in FIGS. 9 and 10, the first and second bolts 900, 902 may be used to couple the first wear plate 500 to the surface 416 of the first ledge 408. For example, the first and second bolts 900, 902 may be inserted through the respective first and second openings 904, 906 in the first wear plate 500 and through the respective first and second openings 908, 910 in the first ledge 408. Then, the first and second nuts 912, 914 may be coupled to (threaded onto) the respective first and second bolts 900, 902. In other examples, the first wear plate 500 may be coupled to the surface 416 via another mechanical and/or chemical fastening technique. For example, in addition to or as an alternative to the first and second bolts 900, 902, the first wear plate 500 may be shrink-fit to the surface 416 of the first ledge 408. In some examples, one or more shims or plates may be disposed between the first wear plate 500 and the first ledge 408 to adjust the location of the first wear plate 500 relative to the first ledge 408.

At block 1406, the filler plate 504 for the second stop pad 414 is selected based on a desired position of the second wear plate 502 (which defines the position of the first wing tip 116 in the extended position). For example, the filler plate 504 may be selected from a plurality of fillers plates having different thicknesses. In some examples, a thicker filler plate 504 may be selected, but may be elastically deformed (reduced in thickness) during the rigging process. In some examples, instead of selecting a different thickness of a frangible filler plate, only one thickness frangible filler plate is offered (e.g., a minimum thickness filler plate that yields). Then, a plate or shim (constructed of a non-frangible material) is selected from a plurality of shims having different thickness. The shim may be disposed between the filler plate and the second wear plate 502 and/or between the filler plate and the surface 418. The combination of the selected shim and the filler plate may similarly be used to position the second wear plate 502 from the second ledge 410. Additionally or alternatively, multiple shims may be used.

At block 1408, the filler plate 504 is disposed on the surface 418 of the first wing tip 116. At block 1410, the second wear plate 502 is disposed on the filler plate 504 (which is disposed on the surface 418). In other examples, the second wear plate 502 and the filler plate 504 may coupled to each other first, and then may be disposed on the surface 418 as a unit.

At block 1412, the second wear plate 502 and the filler plate 504 are coupled to the surface 418 via one or more fasteners. For example, as shown in FIGS. 6 and 7, the first and second bolts 600, 602 may be used to couple the second wear plate 502 and the filler plate 504 to the surface 416 of the second ledge 410. For example, the first and second bolts 600, 602 may be inserted through the respective first and second openings 604, 606 in the second wear plate 502 and the filler plate 504 and through the respective first and second openings 608, 610 in the second ledge 410. Then, the first and second nuts 616, 618 may be coupled to (threaded onto) the respective first and second bolts 600, 602. In examples, prior to torquing down the first and second nuts 616, 618, the first wing tip actuator 122 may be activated to apply relatively large load (e.g., a load that is larger than any load exhibited during normal operation) to the first wing tip 116 that pushes the first and second stop pads 412, 414 together, which causes the filler plate 504 to yield and enables the first and second wear plates 500, 502 to become coplanar. Then, the first and second nuts 616, 618 may be tightened down to clamp the second wear plate 502 and the filler plate 504 in this rigid state. In other examples, the second wear plate 502 and the filler plate 504 may be coupled to the surface 418 via another mechanical and/or chemical fastening technique.

The use of the terms "first," "second," "third," etc. in connection with any parts (e.g., stop pads, wear plates, surfaces, etc.) is merely used to distinguish one part from another part. These terms are non-limiting and are not intended to indicate a specific sequence or specific number of parts.

From the foregoing, it will be appreciated that example methods, apparatus, and articles of manufacture have been disclosed that reduce or eliminate wear and/or damage to the structural components of an aircraft wing having a folding wing tip, thereby reducing overall manufacturing and maintenance costs. As such, the example stop pads disclosed herein enable the use of high preference folding wing tips with minimal maintenance. Such folding wing tips significantly improve fuel efficiency of an aircraft.

While the example stop pads disclosed herein are described in connection with aircraft folding wing tips, the example stop pads can also be used in connection with other types of structures (e.g., non-aircraft structures) where one component is raised and/or lowered to a precise location. For example, the stop pads may be used in connection with a bascule bridge (sometimes referred to as a drawbridge). The stop pads may be positioned to interface between a movable leaf of the bridge and a fixed side of the bridge. The example stop pads can reduce wear and/or damage to the parts of the bridge and/or ensure proper alignment of the leaf and the fixed side of the bridge.

The following paragraphs provide various examples of the examples disclosed herein:

Example 1 includes an aircraft wing including a fixed wing portion and a wing tip moveably coupled to the fixed wing portion about a hinge axis. The wing tip is moveable between an extended position and a folded position. The aircraft wing also includes a first stop pad coupled to the fixed wing portion, the first stop pad having a first contact surface, and a second stop pad coupled to the wing tip, the second stop pad having a second contact surface. The first and second contact surfaces to engage each other when the wing tip is in the extended position. A contact plane between the first and second contact surfaces is coplanar with the hinge axis.

Example 2 includes the aircraft wing of Example 1, wherein the first stop pad includes a first wear plate and the second stop pad includes a second wear plate. The first wear plate is constructed of a harder material than the second wear plate.

Example 3 includes the aircraft wing of Example 2, wherein the first wear plate is constructed of stainless steel and the second wear plate is constructed of a copper-nickel-tin alloy.

Example 4 includes the aircraft wing of Examples 2 or 3, wherein the second stop pad includes a filler plate. The filler plate is disposed between the second wear plate and a surface on the wing tip to which the second stop pad is coupled.

Example 5 includes the aircraft wing of Example 4, wherein the filler plate is constructed of a frangible material.

Example 6 includes the aircraft wing of any of Examples 1-5, wherein the second stop pad is coupled to the wing tip via a bolt.

Example 7 includes the aircraft wing of Example 6, wherein a head of the bolt is countersunk below the second contact surface.

Example 8 includes the aircraft wing of any of Examples 1-7, wherein the second stop pad is coupled to a ledge of a rib of the wing tip. The rib includes a lug opening to receive a lug of a locking mechanism.

Example 9 includes the aircraft wing of any of Examples 1-8 claim 1, further including a third stop pad coupled to the fixed wing portion, the third stop pad having a third contact surface, and a fourth stop pad coupled to the wing tip, the fourth stop pad having a fourth contact surface. The third and fourth contact surfaces are to engage each other when the wing tip is in the extended position.

Example 10 includes an aircraft wing includes a folding wing tip and a stop pad coupled to the folding wing tip. The stop pad includes a filler plate disposed on a surface of the wing tip and a wear plate disposed on the filler plate, such that the filler plate is disposed between the surface of the wing tip and the wear plate.

Example 11 includes the aircraft wing of Example 10, wherein the wear plate includes a feature formed in a contact surface of the wear plate. The feature is to indicate an amount of wear to the wear plate.

Example 12 includes the aircraft wing of Examples 10 or 11, wherein the wear plate is constructed of a harder material than the filler plate Example 13 includes the aircraft wing of any of Examples 10-12, wherein the wear plate is constructed of a copper-nickel-tin alloy.

Example 14 includes the aircraft wing of any of Examples 10-13, wherein the filler plate is constructed of an aluminum-silicon bronze alloy.

Example 15 includes the aircraft wing of any of Examples 10-14, wherein the stop pad is coupled to the wing tip via a bolt.

Example 16 includes the aircraft wing of Example 15, wherein a head of the bolt is countersunk below a contact surface of the wear plate.

Example 17 includes the aircraft wing of Examples 15 or 16, wherein an end of the bolt extends into a cavity formed in a bottom surface of the wing tip.

Example 18 includes a method including disposing a filler plate on a surface of a wing tip of an aircraft, the wing tip moveably coupled to a fixed wing portion of the aircraft, disposing a wear plate on the filler plate, such that the filler plate is disposed between the surface of the wing tip and the wear plate, and coupling the filler plate and the wear plate to the surface of the wing tip via a threaded fastener.

Example 19 includes the method of Example 18, wherein the wear plate is a first wear plate, further including coupling a second wear plate to a surface of the fixed wing portion, the first wear plate and the second wear plate to engage each other when the wing tip is in an extended position.

Example 20 includes the method of Examples 18 or 19, furthering including, prior to disposing the filler plate on the surface of the wing tip, selecting the filler plate from a plurality of filler plates having different thicknesses.

Although certain example methods, apparatus, and articles of manufacture have been disclosed herein, the scope of coverage of this patent is not limited thereto. On the contrary, this patent covers all methods, apparatus, and articles of manufacture fairly falling within the scope of the claims of this patent.

What is claimed is:

1. An aircraft wing comprising:
a fixed wing portion;
a wing tip moveably coupled to the fixed wing portion about a hinge axis, the wing tip moveable between an extended position and a folded position;
a first stop pad coupled to the fixed wing portion, the first stop pad including a first wear plate, the first stop pad having a first contact surface; and
a second stop pad coupled to the wing tip, the second stop pad including a second wear plate, the first wear plate constructed of a harder material than the second wear plate, the second stop pad having a second contact surface, the first and second contact surfaces to engage each other when the wing tip is in the extended position, a contact plane between the first and second contact surfaces being coplanar with the hinge axis.

2. The aircraft wing of claim 1, wherein the first wear plate is constructed of stainless steel and the second wear plate is constructed of a copper-nickel-tin alloy.

3. The aircraft wing of claim 1, wherein the second stop pad includes a filler plate, the filler plate disposed between the second wear plate and a surface on the wing tip to which the second stop pad is coupled.

4. The aircraft wing of claim 3, wherein the filler plate is constructed of a frangible material.

5. The aircraft wing of claim 1, wherein the second stop pad is coupled to the wing tip via a bolt.

6. The aircraft wing of claim 5, wherein a head of the bolt is countersunk below the second contact surface.

7. The aircraft wing of claim 1, wherein the second stop pad is coupled to a ledge of a rib of the wing tip, the rib including a lug opening to receive a lug of a locking mechanism.

8. The aircraft wing of claim 7, wherein the ledge is a first ledge and the rib is first rib, the first stop pad coupled to a second ledge of a second rib of the fixed wing portion.

9. The aircraft wing of claim 1, further including:
a third stop pad coupled to the fixed wing portion, the third stop pad having a third contact surface; and
a fourth stop pad coupled to the wing tip, the fourth stop pad having a fourth contact surface, the third and fourth contact surfaces to engage each other when the wing tip is in the extended position.

10. An aircraft wing comprising:
a folding wing tip; and
a stop pad coupled to the folding wing tip, the stop pad including:
a filler plate disposed on a surface of the wing tip; and
a wear plate disposed on the filler plate, such that the filler plate is disposed between the surface of the wing tip and the wear plate.

11. The aircraft wing of claim 10, wherein the wear plate includes a feature formed in a contact surface of the wear plate, the feature to indicate an amount of wear to the wear plate.

12. The aircraft wing of claim 10, wherein the wear plate is constructed of a harder material than the filler plate.

13. The aircraft wing of claim 12, wherein the wear plate is constructed of a copper-nickel-tin alloy.

14. The aircraft wing of claim 13, wherein the filler plate is constructed of an aluminum-silicon bronze alloy.

15. The aircraft wing of claim 10, wherein the stop pad is coupled to the wing tip via a bolt.

16. The aircraft wing of claim 15, wherein a head of the bolt is countersunk below a contact surface of the wear plate.

17. The aircraft wing of claim 15, wherein an end of the bolt extends into a cavity formed in a bottom surface of the wing tip.

18. A method comprising:
- disposing a filler plate on a surface of a wing tip of an aircraft, the wing tip moveably coupled to a fixed wing portion of the aircraft;
- disposing a wear plate on the filler plate, such that the filler plate is disposed between the surface of the wing tip and the wear plate; and
- coupling the filler plate and the wear plate to the surface of the wing tip via a threaded fastener.

19. The method of claim 18, wherein the wear plate is a first wear plate, further including coupling a second wear plate to a surface of the fixed wing portion, the first wear plate and the second wear plate to engage each other when the wing tip is in an extended position.

20. The method of claim 18, furthering including, prior to disposing the filler plate on the surface of the wing tip, selecting the filler plate from a plurality of filler plates having different thicknesses.

\* \* \* \* \*